United States Patent

Rebeyrolle et al.

[11] Patent Number: 5,618,365
[45] Date of Patent: Apr. 8, 1997

[54] PROCESS FOR MANUFACTURING A TUBE WITH A WALL CONTAINING MORE THAN 60% OF PLASTICS MATERIAL AND HAVING A SKIRT AND A NECKED HEAD AND A CORRESPONDING TUBE

[75] Inventors: Michel Rebeyrolle, Sainte-Ménéhould; Jacques Benquet, Talant; Emmanuel Bricout, Sainte-Ménéhould, all of France

[73] Assignee: Cebal S.A., Clichy, France

[21] Appl. No.: 177,330

[22] Filed: Jan. 4, 1994

[30] Foreign Application Priority Data

Jan. 19, 1993 [FR] France .................................. 93 01065

[51] Int. Cl.$^6$ ........................................................ B32B 31/20
[52] U.S. Cl. .................... 156/73.1; 156/245; 156/308.2; 264/320; 264/322; 264/328.2; 264/DIG. 41
[58] Field of Search ........................... 156/69, 73.1, 242, 156/245, 309.6, 309.9, 308.2; 264/320, 322, DIG. 41, 328.2; 222/107; 425/508, 520, 521

[56] References Cited

U.S. PATENT DOCUMENTS

| | | | |
|---|---|---|---|
| 1,754,496 | 4/1930 | Barker | 222/107 |
| 2,268,462 | 12/1941 | Sachsenroder et al. | 222/107 |
| 2,313,031 | 3/1943 | Parkhurst | 222/107 |
| 2,396,635 | 3/1946 | Bogoslowsky | 222/107 |
| 3,823,850 | 7/1974 | Holoubek et al. | 222/107 |
| 3,832,964 | 9/1974 | Rockefeller | 222/92 |
| 3,998,682 | 12/1976 | Harmsen | 156/309.6 |
| 4,219,525 | 8/1980 | Greenspan | 264/322 |
| 4,418,841 | 12/1983 | Eckstein | 222/107 |
| 4,851,062 | 7/1989 | Tartaglione | 156/69 |
| 5,069,856 | 12/1991 | Holoubek et al. | 264/322 |
| 5,232,755 | 8/1993 | Komiya et al. | |

FOREIGN PATENT DOCUMENTS

| | | |
|---|---|---|
| 477254 | 12/1974 | Australia . |
| 0475126 | 3/1992 | European Pat. Off. . |
| 1504862 | 10/1969 | Germany . |
| 541409 | 10/1973 | Switzerland . |
| 1118632 | 7/1964 | United Kingdom . |
| 1226947 | 3/1971 | United Kingdom . |

Primary Examiner—Michael W. Ball
Assistant Examiner—Richard Crispino
Attorney, Agent, or Firm—Dennison, Meserole, Pollack & Scheiner

[57] ABSTRACT

The invention disclosure relates to a process for manufacturing a collapsible tube with a wall containing more than 60% by volume of plastic material from a substantially cylindrical, or tubular, blank. The inside and outside layers of the tubular blank are of polymeric plastic material, and the tube has a skirt and a necked head. In the process a shaping operation is performed where an end portion of the tubular blank is necked by bringing closer together inner and outer tools, thus producing crumpled folding of the end of the tube. Prior to the shaping operation the blank is heated in order to bring the portion of the end portion to be shaped to a temperature at the time of the shaping operation which is at least equal to the melting point of the polymeric plastic material forming of the layers the inside and outside surfaces of the wall of the blank. The polymeric plastic material is thus in a viscous molten state at the time of the shaping operation. By virtue of the shaping operation, the crumpled folds are formed by simply bringing closer together the inner and outer tools so that when the folds are fully crushed between the tools and the folds are completely welded to each other, thereby producing the necked head and shoulder integral with the remaining skirt portion of the previously tubular blank.

27 Claims, 5 Drawing Sheets

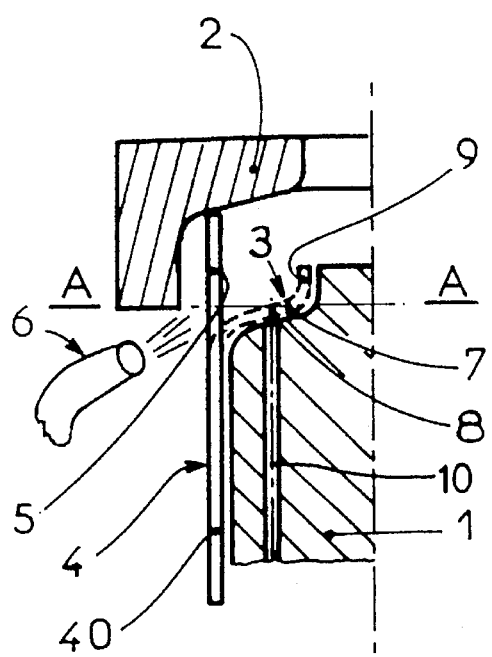
FIG_1
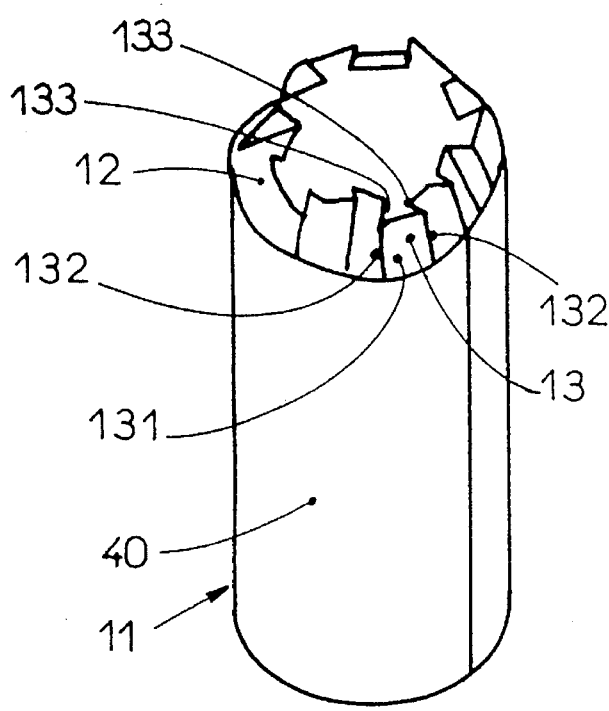
FIG_2
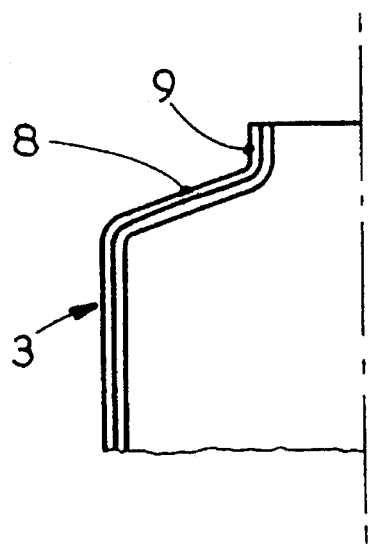
FIG_3
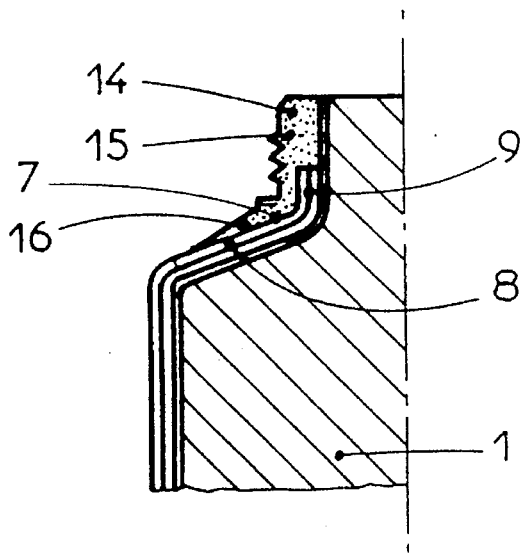
FIG_4

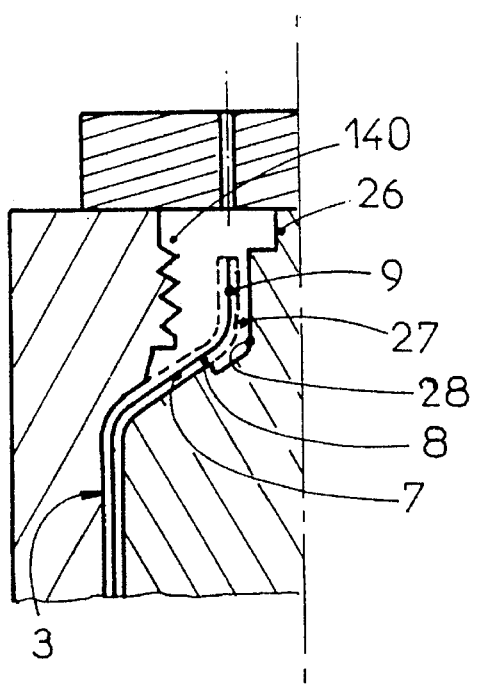
FIG_12
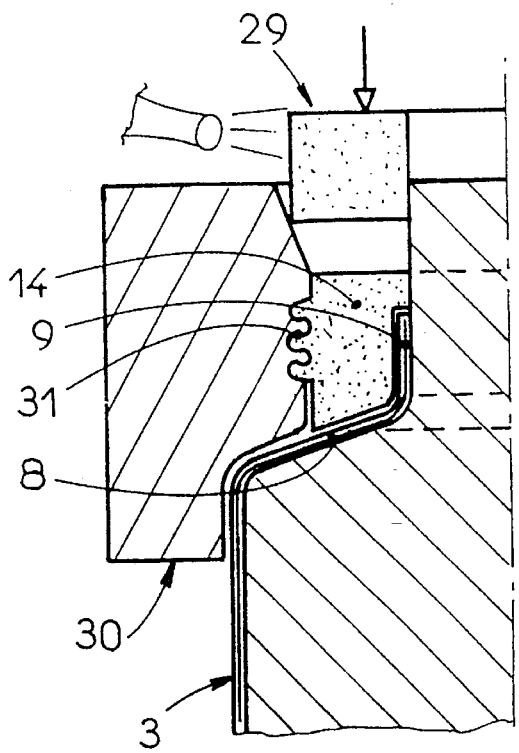
FIG_13
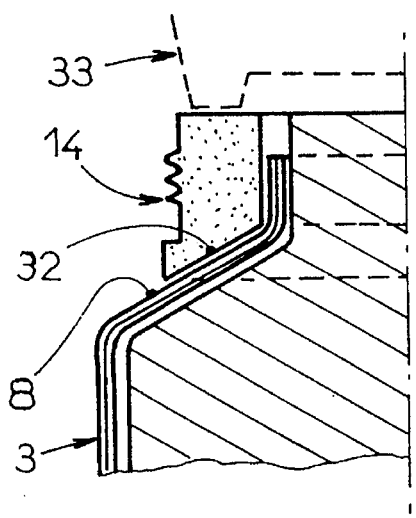
FIG_14
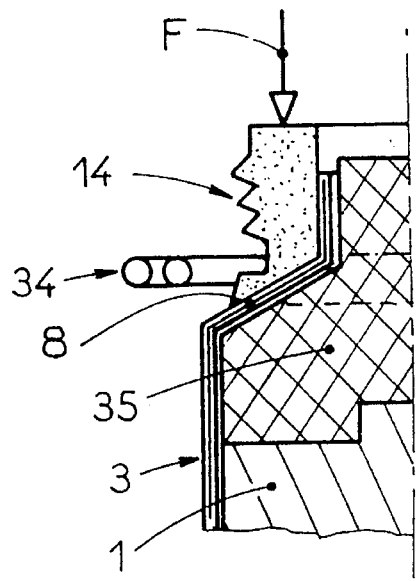
FIG_15

PROCESS FOR MANUFACTURING A TUBE WITH A WALL CONTAINING MORE THAN 60% OF PLASTICS MATERIAL AND HAVING A SKIRT AND A NECKED HEAD AND A CORRESPONDING TUBE

The invention relates to a process for manufacturing a tube with a wall containing more than 60%, by volume of plastic material(s). From a substantially cylindrical tubular blank, the inside and outside surfaces of this blank being made of polymeric plastic material(s) and said tube having a skirt and a necked head, said process comprising a shaping operation where an end portion of the blank is necked by bringing closer together inner and outer tools, said shaping operation producing crumpled folds on said portion.

A process and tube such as these are known from the patent U.S. Pat. No. A-3,823,850=AU-A-477254. According to that patent the shaping operation of the necked head of the tube, where the wall preferably comprises a metal barrier layer between layers of plastic material(s), is carried out mechanically without heating between an outer tool and fingers which move pivotally through the tool, producing an undulating structure which is preferably stabilised by heating the inside of the tube. The undulating structures are then deformed by rotation into a series of uniform uni-directional rigid folds.

The folded head is then preferably introduced into a tool inside which the plastic material(s) is injected which coats the outside of the folded head and which becomes stuck to the folds. In this operation, the head can be clamped in such a way that the piled up rigid folds become bonded together by the effects of the heat from the injected plastic material(s) and the clamping.

This process is complicated. It is only possible to obtain rigid folds on the necked head before the plastic material(s) is injected by having a wall with a metal barrier layer, since the walls which are polymeric or elastic. A good bond between the folds is only produced after said injection operation.

The Applicant has tried to realise a process which avoids the afore-mentioned drawbacks.

DESCRIPTION OF THE INVENTION

The invention is concerned with a process for manufacturing a tube with a wall containing more than 60% by volume of plastic material(s), from a substantially cylindrical tubular blank, the inside and outside surfaces of the blank being made of polymeric plastic material(s), and said tube having a skirt and a necked head, said process comprising a shaping operation where an end portion of the blank is necked by bringing closer together inner and outer tools, said shaping operation producing crumpled folds on said portion, the process being disclosed in the cited document. The process is characterised in that:

a) prior to said shaping operation said blank is heated in order to obtain for said portion a temperature at the time of the shaping operation which is at least equal to the melting point of each of said polymeric plastic material(s) forming the inside and outside surfaces of the wall of said blank, these materials being thus in a viscous molten state at the time of the shaping operation;

b) according to said shaping operation, the crumpled folds are formed by simply bringing closer together the tools, these folds being crushed between said tools, and the folds being completely welded to each other, thereby producing said necked head which comprises at least one shoulder thus shaped.

In the present description, the term "fold" means "part of a wall turned back on itself and forming a double thickness" and "folded region" relates to the line or narrow folded back zone or folding of a "fold" of this kind.

The process of the invention is perfect for manufacturing tubes which have walls of varying structure: for example, in one single layer, or multi-layered without an intermediate layer providing a significant barrier effect to oxygen, dampness, flavourings and smells, or, depending on the problem posed, multi-layered comprising an intermediate layer providing an important barrier effect, the layer typically being of small thickness—0.01 to 0.05 mm—at the level of the tubular blank, whether that layer is metal or made of a polymeric plastic material(s). Whereas plastic material(s)s can be deformed through elongation, they cannot be reduced in length unless the products involved are ones which are heat-shrinkable. The Applicant has had the surprising idea of starting with a tubular blank which is internally and externally of polymeric plastic material(s) and which is brought to a temperature which is at least equal to the melting point of that/those plastics material(s) and to shape a portion of the blank into the necked head of the tube between the inner and outer tools defining the geometry of the desired tube. The neck, defined by the ratio of the maximum external diameter (that of the skirt) and the minimum diameter which is typically greater than 1.25, and, more typically greater than 1.4, is produced with crumpled folds produced by simply bringing closer together inner and outer tools, and the shaping operation which produces the neck produces a necked head which is perfectly welded within its thickness and over its inner and outer surfaces.

The following significant and surprising effects are produced:

the crumpled and crushed folds between the tools which have been brought together become perfectly welded to each other on each face of the necked head, they are re-arranged and thinned out variably in the thickness of the necked head;

the faces are smooth, the crushed foldings of the folds are scarcely visible, or not visible at all;

by virtue of the temperature of the shaping operation, the successive layers of the wall of the blank, particularly its intermediate layer(s) providing the barrier effect, are folded and crushed becoming thinner, and this happens without any breakage;

the folding and thinning flattening mechanism is used typically to obtain a head with an annular shoulder, which, in thickness, is close to the thickness of the skirt, the shoulder thus being easy to crush laterally, thereby facilitating emptying of the tube by the end consumer.

The selection of the temperature at the time of the shaping operation is made such that despite the crumpled folds a wall of a necked head is produced which has the same qualities of use as a wall without folds.

It should be remembered that the reel ting point of plastic material(s)s corresponds to the melting of its crystallites or crystalline phases, and that after that melting point the material is in a viscous molten state whose viscosity which is first of all high decreases with temperature, the temperatures and viscosities which are appropriate for the injection moulding operation being for example more than 100° C., above the fusion point.

The shaping temperature which makes the polymeric plastic material(s) into a "viscous molten state" should be clearly differentiated from temperatures which give soft states which are used, for example, for heat-shaping and which are below the melting point.

The process is very simple, and it merely comprises a heating operation and a shaping operation by crushing which give perfect welding of the necked head obtained. On a micrograph it is only possible to distinguish the individual folds by their intermediate barrier folds when present. The shaping operation and quality of the tubes obtained depend, in the same way, on the various qualities of the tubes: entirely polymeric with a barrier without layers, or polymeric with more than 60% by volume with a metal barrier layer.

Usually, in the process where the folds are crushed and welded together, an exudate of plastic material(s) is produced of said folds on each face of the shaped shoulder which forms a glaze on that face. Said folds are advantageously crushed in such a way as to obtain a thickness of said shoulder shaped which is less than 1.35 times the thickness of the skirt of the tube. The shoulder can thus be crushed laterally, and this enables the tube to be emptied more thoroughly, particularly when its skirt is less than 0.7 mm in thickness.

Of the methods of heating the end portion to be shaped into a necked head the following mode of operation which is particularly advantageous for large scale production: in step (a) the tubular blank is first of all placed between said inner tool which has a top part defining the inside of said necked head and a rigid sleeve which surrounds the end portion with slight clearance and which passes upwardly beyond it, said end portion of the blank and said top part of the tool being in a high position, and then hot air heats the inside of said portion until that portion becomes deformed into an undulating necked portion which has a molten end edge. Then, said sleeve is removed from said undulating necked portion, and step (b) follows.

The air could be replaced by another gas or mixture of gases.

The above-mentioned heating arrangement which can be summarised as: "top position+heating the inside of the end portion+sleeve beyond it" is of utmost importance:

without a sleeve the heated end becomes deformed into an outer corolla (FIG. 16)

with the sleeve, and only if it passes upwardly beyond the end portion, an initial necking is obtained in a reproducible manner with undulations (FIG. 18), the reduction to the mean diameter of the end then typically being 3 to 8 mm and being accompanied by a molten end edge which shows that the desired temperature for the shaping operation (b) has been exceeded.

The sleeve thus prevents outward deformation of the end portion, and it appears to retain a cloud of hot air which envelopes the end of the portion and surprisingly causes it to become inflected inwardly. It also appears to play a part in controlling the heating of the inside of the end portion, somewhat like a radiator. A low position would not allow such a result since air or gas rises and since the end portion is drawn downwards by gravity.

The initial necking thus obtained with the molten edge permits good control of the heating operation and prepares the necking by rapid crushing performed during the shaping operation.

The first heating method is carried out in accordance with the following preferred features:

the inside of said end portion is heated by introducing a nozzle into it which radially ejects air heated to at least 250° C. through lateral orifices, comprising orifices which are provided for the heating operation at a level between half way up the end portion and 3 mm below the end of said portion;

preferably, heating up of the top part is reduced by the use of a deflector and insulating element fixed under the nozzle;

preferably, to improve the homogeneous nature of the temperature of the end portion during the shaping operation, the outer tool is heated between 100° and 150° C. and is provided with an inner, non-stick coating.

A second heating method is advantageous in that it simplifies the process and device used: steps (a) and (b) merge since the end portion is heated by the outer tool which is heated to between 150° and 300° C. during the flattening of said crumpled folds. However, the surface of the necked shoulder is then slightly granular in appearance, even when there is an inner non-stick coating on the inside of the outer tool or die.

The temperature at the time of the shaping operation is preferably more than 10° to 100° C. than the melting point of each of the plastic material(s) on the surface of the wall. If the temperature is closer to the melting point, the welding of the folds to each other is likely to be imperfect. If the temperature is more than 100° C. more than the melting point of the material in question, the less viscous plastic material(s) is likely to no longer retain a good hold on the face through wetting and is likely to run off.

To facilitate temperature control at the time of the shaping operation, when heating up is done, for example, to 10° or 20° C. more, it is preferable that the two plastic material(s) on the surface of the wall of the blank have close melting points, which differ by 40° C. at the most. This makes it possible to have fairly similar viscous molten viscosities and consistencies at the selected temperature, which, when the folds are welded together, give the same results on the inside and outside of the necked head.

For the sake of economy and quality of the welding of the folds together it is preferable to select materials for the surfaces of the blank wall from the group comprising the following 5 families:

polyethylenes (PE) including linear polyethylenes;

polypropylenes (PP);

polyamides (PA);

modified polyamides;

polymeric alloys such as PE/PA and PP/PA;

and saturated polyester comprising PET (polyethylene terephthalate) and PBT (polybutylene terephthalate).

It is not obligatory, but is highly preferable, that the plastic material(s) comprising the surface of the blank wall both belong to one and the same family. Then, at the time of the shaping operation, they will have a comparable viscosity and will be similarly easy to crush.

In particular, the family of polyethylenes is used including linear polyethylenes with a temperature at the time of the shaping operation which is preferably between 150° and 220° C. On the inside it is possible to use as an alternative an ionomer resin with a polyethylene base, such as SURLYN (registered trade mark for a group of thermoplastic ionomer resins). In particular, the family of polypropylenes is used with a temperature at the time of the shaping operation of between 210° and 270° C.

As already stated, the blank can have a wall which is made of one single polymeric material which is then combined with the materials of which the wall surface is made according to the foregoing description.

A second instance which is particularly advantageous is that where the polymeric plastic material(s) of which the blank wall is made respectively form the inner surface layer and the outer surface layer of said wall, this wall being multi-layered and comprising between said surface layers at least one intermediate layer which provides a barrier effect, and which is bonded to the surface layers.

The intermediate layer(s) therefore extends/extend continuously, and each is in one single piece from the bottom of the skirt of the tube to the top of the necked head. Their folds inside the crumpled folds of the wall make the barrier protection still more effective at the level of the necked head. In most cases, the wall of the blank is 0.2 to 0.9 mm in thickness, and said intermediate layers which provide a barrier effect have a total thickness of between 0.01 and 0.05 mm and are made of a material which belongs to the group formed by: modified EVOH (ethylene and vinyl alcohol copolymer), PVDC (vinylidene polychloride), PAN (polyacrylonitrile), PVDF (vinylidene polyfluoride), PA (polyamide), modified PAs including MXD6 (6 metaxylene diamine), vinyl chloride and vinylidene copolymer ("saran") and slightly alloyed aluminium, usually called "aluminium" in such instances of usage.

Each intermediate layer providing a barrier effect can also be made of one of the materials from the group constituted by PE and polyesters, this layer being coated with a deposit comprising silica and/or alumina and/or amorphous carbon.

As far as the configuration and structure of the necked head are concerned:

it typically comprises a neck which is less in diameter than the skirt and an annular shaped shoulder which joins the neck to the skirt;

in the shaping process of the invention, the folds are crushed in such a way as to obtain for said shoulder a thickness that is less than 1.35 times the thickness of said skirt, which can typically be between 0.9 times and 1.25 times said thickness of the skirt and preferably less than or equal to 0.6 mm for ease of lateral crushing;

the neck above it can be shaped directly into a bottle-neck of the tube. The outer tool of the process can thus comprise annular members which are contracted, i.e., moved radially inward when the blank is raised by the inner tool, the annular members having inner relief which form fixation reliefs for fixing a stopper on the outside of the bottle neck.

In order to obtain a bottle-neck of the desired size, it is also possible to fix to the necked head an annular rim made of plastic material(s) which thus constitutes the outside of the bottle-neck of the desired tube. The rim can be made in several ways:

by compression moulding onto the necked head an annular blank which has been pre-heated to between 60° and 150° C., and preferably at least 70° C., and up to about 140° C. above the fusion point of the material of the outer surface layer of the tube, with the inner tool being in place; it is thus a question either of deforming a blank, with moulding, in a softened state, or of compression moulding a blank in a viscous molten state;

by sticking or welding a connected rim, as illustrated in the examples;

by injection moulding onto the necked head. Particularly when the skirt is already decorated, the outer surface of the necked portion retains the memory of the effects of electric discharges which were applied prior to decoration in such a way that the rim is fixed there less reliably, and it is possible to improve fixture inside the bottle-neck by means of moulded straps which end under the shoulder (see examples).

For all the fixing methods described hereinabove, apart from the sticking method, the plastic material(s) of the annular rim is preferably compatible, when it fuses, with the material of which the outside of the shaped tube is made, so that the rim is perfectly welded to the necked head.

To reinforce fixture of the afore-mentioned annular rim to the necked head of the tube it is possible to provide it with a base which is widened on the outside and which fits the shaped shoulder of the tube. To obtain a tube shoulder which is able to be crushed to a large extent, it is preferable to restrict the width of the annular base along a radial generatrix of the shoulder, to less than half the width of the shoulder, or to limit its thickness to less than 0.4 mm outside the half-width dimension of the shoulder.

The shoulder of the tube obtained, or the "finished shoulder" is the frustoconical part which extends from the foot of the bottle-neck to the join between the shoulder and the skirt. In order that the shoulder is able to be crushed laterally, its total thickness is preferably less than 1 mm mid point of the finished shoulder and less than 0.8 mm at said joinder.

All the above-mentioned methods for fixing the annular rim can be employed by using as the inner tool which holds the shaped tube the inner hot shaping tool, or an identical tool, which is advantageous. It is also possible to use moulding methods to form an annular rim which is provided not only on the outside of the neck of the tube shaped, but also on the inside thereof, provided that the plastic material(s) of the rim is compatible in terms of its melting properties with the plastic material(s) of which the outside and inside of said tube are respectively made, in order to obtain perfect welding of the rim to the two faces of the tube, and thus by using an inner tool which defines a narrower bottle-neck than the inside of the neck of the tube. These methods are those which require the melting point of the plastic material(s) of the rim to be exceeded, namely moulding, typically by injection, and compression of the annular blank into a molten state which is still sufficiently viscous and which is obtained by a preheating operation between the melting point and that melting point +140° C.

The invention also relates to a tube with a wall containing more than 60% plastic material(s), the inside and outside surfaces of the wall being of polymeric plastic material(s), said tube having a skirt which is between 0.2 and 0.9 mm in thickness and a necked head comprising an annular shoulder which is shaped in such a way that it is between 4 and 20 mm in width, the necked head having crumpled folds which are piled up and bonded together inside and outside said wall, characterised in that the folds are of variably reduced thickness and are perfectly welded together, and that each face of the shoulder is glazed by an exudate of the plastic material(s) of which the surface of said face is made, this plastic material(s) having come away from the folds in the molten state and having been spread out and smoothed, and in that said shoulder comprising said folds is in thickness less than 1.35 times said thickness of the shirt and is easily able to be flattened laterally.

This tube has a wall which preferably contains an intermediate layer which provides a barrier effect and a necked head which comprises a neck of smaller diameter than that of the skirt and an annular shoulder which joins the neck to said skirt, the shoulder comprising said crushed and welded folds and being between 0.9 times and 1.25 times the thickness of the skirt, and said intermediate layer extends in one single piece from the bottom of the skirt to the top of the shoulder, with the folds of reduced thickness being included in said folds of the shoulder.

It should be noted that the outer and inner faces of the shoulder are each glazed by an exudate of plastic material(s) which has come from the crushed folds and which has been spread out and smoothed by the tools. The neck and shoulder of the tube are often surmounted by an annular rim of plastic material(s) which is joined to the neck and to the shoulder and which forms the outside of the bottle-neck of the tube. The rim thus plays no part at all in perfectly welding the folds of the necked head, coming from the heat shaping operation of the head.

Further features of the tube will emerge from the description of the process and/or examples.

Typically, the skirts of the tubes according to the invention are between 13 and 55 mm in diameter. The tubes which have barrier layers are particularly advantageous for storing liquid products, or flavoured or scented creams or pastes, since the barrier protection is in one piece and is reinforced at least at the level of the shoulder.

ADVANTAGES OF THE INVENTION

The production, in one single heat shaping operation, of a tube with a necked head which is perfectly well welded over its entire thickness, from one single tubular blank;

A tube with a continuous barrier layer, the necked head containing superposed folds which enhance the barrier effect:

The addition of an outside of the bottle-neck of a plastic material(s) by selecting simple methods which employ the inner heat-shaping tool.

A tube with a shoulder which can be crushed laterally which is of an easily controlled thickness.

BRIEF DESCRIPTION OF THE DRAWINGS

FIG. 1 shows an axial half-section of a shaping device according to the invention, with a tubular blank prior to the shaping operation and also the shaped tube obtained.

FIG. 2 shows an isometric projection of a tube obtained by the shaping operation at ambient temperature from a first type of blank, for the purpose of comparison (test outside the invention), FIG. 3 shows an axial half-section of the tube obtained according to the invention, made from a first type of blank, FIGS. 4 to 6 show similar tubes which are surmounted by rims, at least on the outside, made of plastic material(s).

FIG. 12 shows an axial half-section of a tube which is surmounted by an annular moulded rim comprising straps for fixing the rim to the inside of the tube.

FIG. 13 shows an axial half-section of the fixture of an annular rim of plastic material(s) to the head of a tube, by compression of the heated rim.

FIG. 14 shows an axial half-section of the ultra-sound welding operation of an annular rim to the head of a tube.

FIG. 15 shows HF induction welding of an annular rim to the head of a tube with a metal barrier layer.

1) PRINCIPLE OF THE INVENTION

Figure 5:
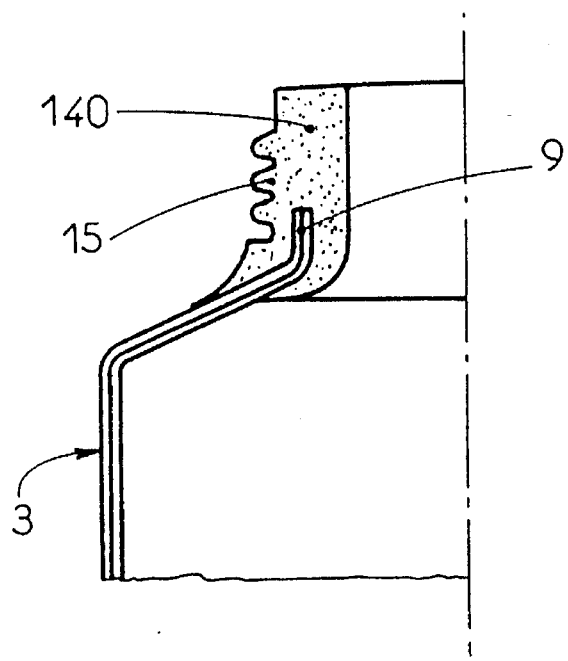

FIG. 1 shows an inner tool or mandrel 1 and an outer annular tool 2 which respectively form the inside and outside of the tube to be produced 3.

The cylindrical tubular blank 4, of external diameter 35 mm, is wrapped around the mandrel 1 and an upper portion 5 passes beyond it. The blank 5 is rolled and welded and comprises inner and outer surface layers of low density polyethylene (PE.BD). The portion 5 was heated with a nozzle with hot air 6 to 190° to 200° C. before the tool 2 was reclosed by axial displacement relative to the mandrel 1, on the portion 5 and before clamping it to the mandrel, giving the tube 3 which is heat-shaped according to the invention and which comprises a skirt 40 which is the unmodified part of the blank 4, and a necked head 7 which comprises a shoulder 8 and a neck 9.

The tube was then ejected from the mandrel 1 by pressurised air through one or more conduits such as 10.

It is seen that only the portion 5 of the tube needs to be heated. The necked head 7 made from crushed and perfectly welded folds has smooth inner and outer surfaces which are glazed by the molten PE which has come away from the flattened folds and has spread out when it made contact with the smooth surfaces of the tools.

2) TESTS ON A FIRST TYPE OF MULTI-LAYERED BLANK

This first type of cylindrical tubular blank is obtained by rolling and by compression welding the weld of a multi-layered film of 0.31 mm in thickness, comprising an intermediate layer of Al which is 37 micrometers in thickness and which is bonded by adhesive layers of EAA to surface layers of PE.BD, namely an outer layer charged with white pigment and 70 micrometers in thickness and an inner transparent layer of 90 micrometers.

FIG. 2 shows a tube 11 shaped from a blank of this type with the device of FIG. 1, without heating the portion to be necked. The necked portion 12 which is obtained 12 consists of a type of shoulder 12 which is placed below the skirt 40, and clearly shows the result of the necking operation: during this operation undulations are made towards the outside and inside which are flattened into folds such as the fold 13 which comprises an outer portion 131 encased by two folded regions 132 and two rear portions 133 partly enclosing the fold 13. The folds have become loose by elastic return. This comparative sample 11 better illustrates the efficiency of the process according to the invention.

FIG. 3 shows a tube 3 which is shaped with the same device and by the same clamping effect between the tools 1 and 2. However, this time the first type of blank is subjected to a heating operation at 190° to 200° C. The shoulder 8 and the neck 9 of the necked head 7 are very smooth. The shoulder 8 is 0.35 mm in thickness and it has a transparent bottom (FIG. 7), and, like with the tubes in FIGS. 3 to 6, allows the arrangement of perfectly welded folds 13 to be seen which are in a rosework design in correspondency with the folded regions 132 of varying size. The outer face of the shoulder 8 is semitransparent, and looking through its smooth surface of PE it is possible to see some subjacent "phantom" folded regions.

FIG. 4 shows the tube 3 which is surmounted by an annular rim 14 which forms the outside of the bottle neck 15. The rim of PE has been injection moulded by using the inner shaping tool 1 as the inner tool 1 which extends below the neck 9 for joining purposes. The rim 14 is welded in perfect continuity with the necked head 7, and its base 16 of increased width terminates with a thickness of less than 0.3 mm beyond the half-width of the annular shoulder 8.

FIG. 5 shows a tube 3 which is identical to that of FIG. 3 and which is surmounted by an annular rim 140 made of moulded PE and which is welded in perfect continuity with the inside and outside of the necked head. The internal diameter of the bottle neck 15 thus defined is 2 mm less than the internal diameter of the neck 9, and an inner tool was used for the moulding operation which was different from the inner shaping tool.

Figure 6:
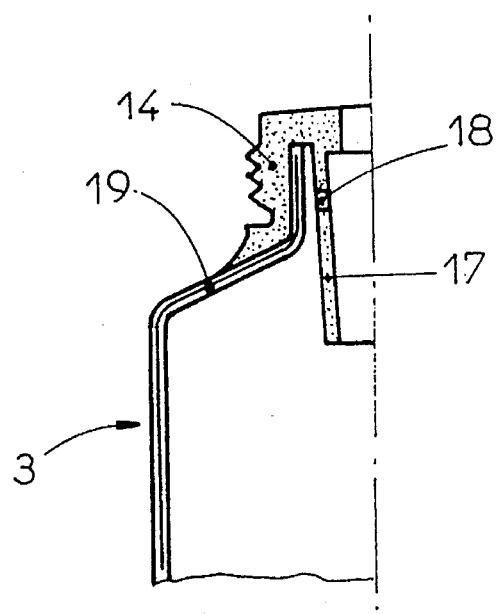
Figure 7:
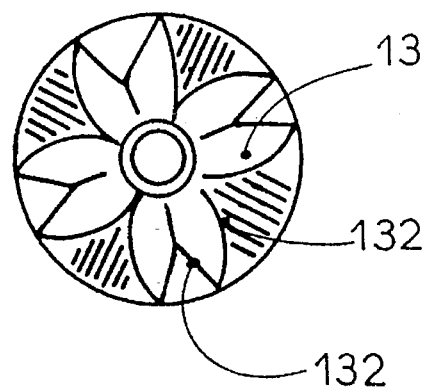
FIG. 7 shows the outside of the inner face of the tube shoulder in FIG. 6.

FIG. 6 shows another tube 3 on which an integrally formed bottle-neck with a double skirt is moulded, and which comprises an annular rim 14 on the outside of the neck 9 of the tube 3 and an inner skirt 17 which comprises grooved and ribbed through openings 18 for product in accordance with the patent FR-B-2 622 542=EP-B-315 554=U.S. Pat. No. A-4,942,981 for the Applicant. The annular gap between the rim 14 and the inner skirt 17 is covered over its entire height by the neck 9 with barrier layer 19 of Al.

3) TESTS ON A SECOND TYPE OF MULTI-LAYERED BLANK (FIGS. 8 TO 12)

Figure 8:
FIGS. 8 to 11 show axial sections of micrographic views of a tube which has been shaped according to the invention from a second type of blank, at the level of the start of the shoulder (FIGS. 8 and 9) and of the top of the shoulder joined to an annular rim moulded to the head of the tube (FIGS. 10 and 11) respectively.
Figure 10:

This second type of tubular blank was obtained by rolling and welding a multi-layered film of thickness 0.325 mm and comprising an intermediate barrier layer 20 of thickness 20 micrometers made of EVOH, and bonded by adhesive layers to the PE layers. A tube 3 was obtained with an annular shoulder which is 0.37 mm in thickness in accordance with the technique described with reference to FIG. 1, and an annular rim 14 of PE, similar to that of FIG. 4, was moulded onto the necked head. FIGS. 8 and 10 show micrographic representations in axial section of the tube wall, showing respectively the part close to the rounded portion of the start of the shoulder and at the level where the top of the shoulder is joined to the rim 14. To simplify the description, FIGS. 9 and 11 show the main parts of FIGS. 8 and 10 respectively.

Figure 9:
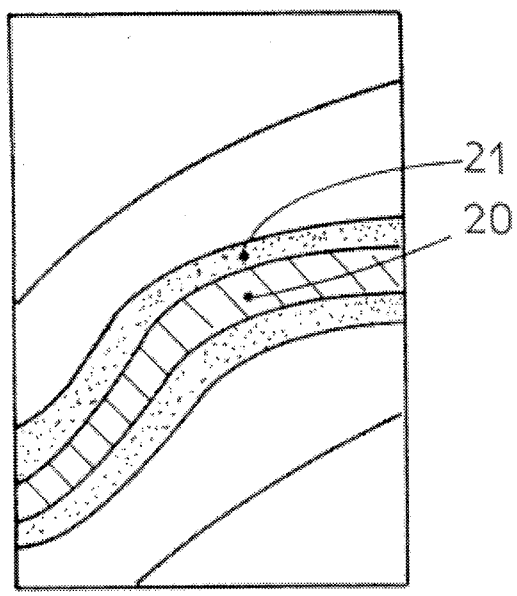

In FIGS. 8 and 9 it is possible to see that the layer 20 of EVOH has substantially retained its initial thickness and is slightly undulating within the thickness due to the difference in the plasticity properties due to the effects of heat of EVOH in comparison with PE. The adhesive layers 21 are marked by dots in FIG. 9.

Figure 11:
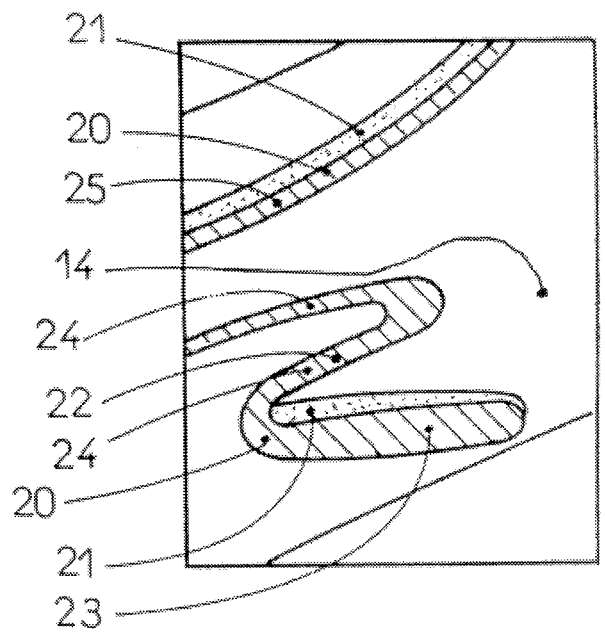

FIGS. 10 and 11 give information on the process and its results:

a double fold 22 of the barrier layer 20 shows an end 23 which differs very little in thickness from the initial thickness, and which has doubtless escaped from the superposition and flattening of the folds, followed by two folds 24 of greatly reduced thickness;

a second portion 25 of a barrier layer 20 which belongs to a fold which was welded with the double fold containing the double fold 22 of the barrier layer;

on the right-hand side of the end 23 and of the double fold 22 is the rim 14 of PE in the form of the surface layers of the tube 3;

the continuity of the weld between the folds, and between the folds forming the shoulder and the annular rim is perfect. The sectional drawing shows the adhesive layers 21 in places, but there is no other discontinuity in the PE encasing the afore-described elements;

the reduction to thickness obtained is surprising, and it can be controlled as required by selecting the hot shaping temperature and by clamping the tools 1 and 2 (FIG. 1).

FIG. 10 shows that the local thickness of the barrier layer and of the folds themselves vary according to a ratio of more than one (24,25) over two (23) layer in the shoulder shaped due to the fact that they are piled up irregularly in the process of the invention.

FIG. 12 shows a tube 3 which is obtained from a second kind of blank, whose necked head 7 is surmounted by an annular rim 140 made of moulded PE both on the inside and outside of the head 7. The rim 140 has a narrower opening 26 than the internal diameter of the neck 9, and under the orifice there are 3 to 5 straps 27 which extend under the shoulder 8 and which are perfectly welded to the inside of the tube 3 which is also made of PE. FIG. 12 shows the inner tool used, comprising grooves 28 which easily make it possible for straps 27 to be obtained from the molten plastic material(s) forming the top of the bottle neck with its narrower orifice 26. This fixing solution is particularly advantageous if the skirt of the tube has already been decorated after surface treatment by electric discharges (corona effect). FIG. 12 also shows the outer tool and the upper tool with injection passages.

4) OTHER METHODS OF FIXING AN ANNULAR RIM MADE OF PLASTIC MATERIAL(S) TO THE HEAD OF A TUBE

FIG. 13 shows the heating operation, which is carried out here with hot air, of an annular blank 29 made of PE and of suitable geometry, followed by compression thereof between the neck 9 and the shoulder 8 of the tube, on the one hand, and an outer tool 30 comprised of a segmented annular tool, one segment of which is shown. The tube 3 has surface layers which are compatible on melting with the PE.

The blank 29 is heated between 150° to 160° C. with hot air. It is in a pasty state, that is to say it is in a very viscous molten state. The axial compression of the blank 29 into an annular rim 14 produces a moulding which results in perfect welding outside the tube 3 and contours 31 for engagement with a stopper when the tool 30 fills the contours hollowed out.

FIG. 14 shows a welding arrangement for an annular rim 14 prepared beforehand with an annular bottom face 32 bearing perfectly on the shoulder 8 of the tube 3. The materials thus in contact are PE. The rim 14 is welded with an annular ultrasonic transducer 33. Thus, annular welded fixture is produced of the rim 14 to the shoulder 8.

FIG. 15 shows an arrangement for induction welding an annular rim 14 prepared beforehand, like that in FIG. 14, which is applied perfectly by an axial force F to the shoulder 8 of the tube 3 which has been shaped, according to the invention, from a first type of blank, that is to say with an intermediate barrier layer of Al. The induction loop 34 heats this layer and also the surface layers of the shoulder 8 and of the rim 14 which are in contact, and produces a weld between these PE layers of perfect continuity. The head of the tube 3 bears on an inner tool 35 made of a hard insulating material during this operation, possibly replacing the top of the tool 1 in FIG. 1.

5) TESTS OF AN INDUSTRIAL NATURE

These tests have been carried out on many thousands of cylindrical tubular blanks 4 of external diameter 35 mm, of two types:

- co-extruded multi-layered blanks of 0.5 mm in thickness which are constituted by an intermediate barrier layer of 20 micrometers in thickness and made of EVOH and bonded by adhesive layers to the surface layers of PE (third type);
- laminated multi-layered blanks which are rolled and welded longitudinally and which are 0.32 mm in thickness, which are also made of EVOH 20 micrometers bonded by adhesive layers to surface layers of PE (second type).

There were 3 working positions with the inner tool which supports the tubular blank moving rapidly from one position to the next: heating position; heat shaping position giving the necked head; compression moulding position of an annular rim onto the necked head.

Figure 17:
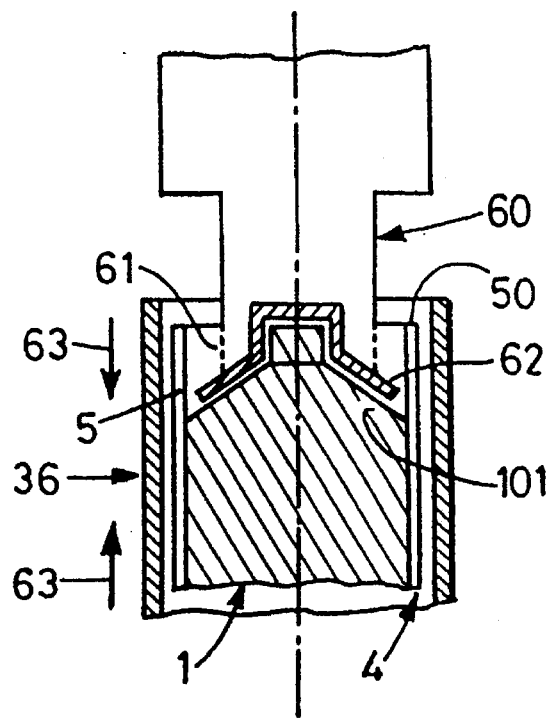
FIG. 17 shows an axial section of a tubular blank which is in position for a second type of internal heating operation.
Figure 18:
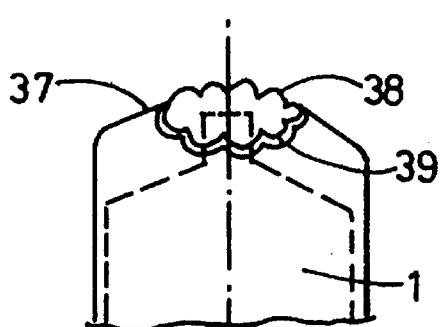
FIG. 18 shows, in perspective, the blank of FIG. 17 after the heating operation.

The tubular blanks 4 used were more than 150 mm in length, and, in the working position, each one embraced the inner tool 1 in such a way that only an upper end portion 5 of length 12 mm passed beyond the tool 1 (FIG. 17).

5.1) First Heating Arrangement

Tests were carried out on the third type of blank. A nozzle blowing hot air of 320° C. through a plurality of lateral orifices 61 of diameter 0.8 mm was introduced into each portion 5, the lateral orifices 61 being in the upper half of the portion 5 and disposed at least 3 mm from the upper end 50 of that portion.

Figure 16:
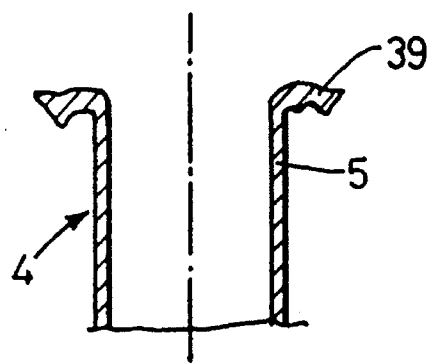
FIG. 16 shows an axial section of a tubular blank after a first type of internal heating operation.

After less than 1.5 seconds the heating operation systematically resulted in the deformation of the upper end 50 of the portion 5 and in the neighbouring region becoming an irregular outer corolla 39 (FIG. 16). This shape was not that desired for the necked portion, and since it became reduced in length was unacceptable for large scale production.

Compared with the satisfactory device of FIG. 17, with this first device there was heating of the inside of the portion 5, but no sleeve 36, and no deflector and insulating element 62 fixed under the base 60. The nozzle had a seal-tight non-insulating bottom made of sheet metal which did not extend outside lateral wall.

5.2) Second Heating Arrangement

A rigid sleeve 36 made of stainless steel 5 mm thick is provided, which slides vertically around the blank 4, as indicated by the arrows 63, In the top position (FIG. 17), it surrounds the portion 5 with a diametral clearance which is less than 1 mm and it passes upwardly beyond it by at least 5 mm.

The extent to which it passes beyond it was set at 20 mm for the series of longer tests, each test being carried out on a few hundred blanks 4.

With this arrangement, inversion of the direction of bending of the upper end 50 of the portion 5 and its closeness relatively to the tests (5.1) was noted systematically. The bending is inward, and, after a constant period of time of blowing hot air inside the portion 5, an undulating necked portion 37 is obtained which has an undulating orifice edge 38 of mean diameter 27 to 30 mm, that is to say 4 to 7 mm less than the internal diameter of the blank 4, and has a molten end edge 39.

The sleeve 36 here plays an important and reproducible part. It appears to retain the hot air to above the end 50 and produces an initial necking which is surprising. The edge of molten appearance and which is typically between 0.5 and 2 mm in thickness is testimony that the maximum temperature attained is much higher than the melting point of the surface layers of the portion 5, at least 30° C. more than said melting point, and the neck 37 shows that the portion itself has reached a similar temperature.

In the tests, the good quality of the heating, marked by the necking 37 hereinabove and its molten end edge 38 was verified by the quality of the necked and crushed heads produced in the heat-shaping operation which followed said heating operation after a period of time of between 2 and 3 seconds. The shaping operation is carried out after the nozzle 60 has been removed to the top and after the sleeve 36 has slid downwards.

After the shaping operation, the welding of the folds 13 in the thickness of the shaped shoulder 8 is perfect, as in the tests carried out on blanks 4 of the second type (FIGS. 8 to 12). The thickness of this shoulder 8 was 0.6 mm. Each face of the shoulder 8 is shaped continuously by a PE exudate and is smooth and glazed. The outer faces of a few shoulders 8 reveal, when they are viewed on a slant, locally "embossed" regions which can result from the folded regions 132 (FIG. 2) close to the surface such as the "phantoms" mentioned in the tests on the first type of blank.

The problem relating to appearance thus still exists in a more discrete manner.

Another problem is apparent: after a couple of dozen tests (heating operation followed by shaping operation), it becomes difficult to eject the tubes 3 from the inside tool or mandrel 1 (FIG. 1), since the necked head adheres to the top part 101 of the tool 1.

5.3) Second Improved Arrangement (FIG. 17)

The bottom, made of sheet metal, of the nozzle 60 was replaced by an outwards extending ceramics cup 62 forming a deflector element which thermally insulates the main part of the top part 101 during the heating operation.

The ejection difficulties disappeared.

5.4) Heating the Portion 5 by the Outer Shaping Tool

The outer tool or matrix 2 is clad internally with a non-stick product—TEFLON® (a registered Trademark for polytetrafluoroethylene, PTFE)—and heated to 210° C. Necked heads of the tubes 3 were thus obtained which were as good in quality as the previous ones, except for the granular state of the surface of the outer face of the shoulders shaped which were in contact with the matrix 2.

The shaping time had been increased, but it was still less than 2 seconds. The surface state of the upper face of the shoulder makes it desirable to cover it with the base of a bottle-neck fixed to the necked head.

5.5) Compression Moulding of an Annular Blank on the Necked Head

An annular rim of PE was then compression moulded onto the necked head 7 on a large number of tubes 3 which had originated from hot shaping treatments carried out in accordance with procedures defined under (5.3) and (5.4), the moulding operation being carried out either after the shaping operation (less than 4 seconds afterwards) or during a subsequent operation. There is very little difference between the results of the moulding operations for these two different time intervals.

Figure 19:
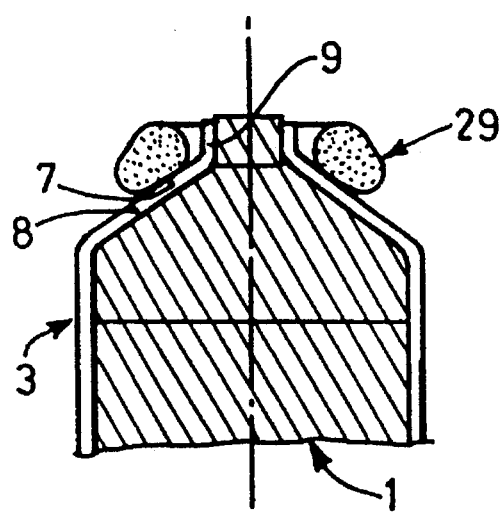
FIG. 19 shows an axial section of a tube with a necked head which is surmounted by an annular blank in a viscous molten state.

An annular bead 29 of molten PE at 220° C. is placed on the shaped shoulder 8, that is to say which is at 90° to 100° C. above its melting point. The PE of the bead 28 is thus sufficiently viscous for the bead 29 to keep its annular shape and to become moderately oval in its cross-sectional shape when it bears on the shoulder 8 (FIG. 19).

The bead 29 was compressed and moulded between the necked head 7, on the one hand, and the top portion of the inner tool 1 which passed beyond the neck 9 of the head 7, and, on the other hand, an outer tool made of extension pieces which cart move apart and which contract for moulding the threaded bottle-neck 15 and its base 16.

Figure 20:
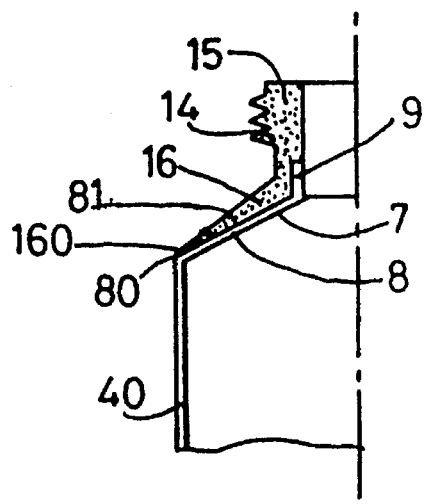
FIG. 20 shows an axial half-section of the same tube after compression moulding of said annular blank.

FIG. 20 shows the structure obtained.

The annular rim 14 made of PE is perfectly welded to the necked head 7. It comprises the bottle-neck 15 and its annular base 16 which extends to less than 1 mm from the join 80 of the shoulder 8 and the skirt 40. The base 16 becomes progressively thinner from less than 0.4 mm at the mid point 81 of the shoulder 8 to less than 0.15 mm at its periphery 160. The bottom 16 has the following thicknesses:

0.7 mm at the foot of the bottle-neck 15, 0.37 mm at the half-width dimension of the shoulder 8, and periphery 160 merged with the start of the join 80.

Since the shoulder 8 is 0.6 mm in thickness, the shoulder (8+16) of the tube obtained is particularly well able to be crushed laterally from its half width dimension.

The bottle neck 15 extends the inner surface of the neck 9 and is perfectly welded to it.

For the sake of economy, the neck 9 was reduced in height to 1 mm in some of the tests, giving a continuous inner surface of the bottle neck without any flaw. The neck 9 can be suppressed, the shoulder shaped 8 being complete, that is to say going as far as the upper axial portion of the tool 1.

The base 16 gives a uniform appearance to the shoulder of the tube 3. It masks any undesirable appearing defects.

5.6) Tests on Blanks of the Second type, Thickness 0.32 mm

A few hundred blanks were subjected to tests similar to those described hereinabove (5.3), (5.4) and (5.5). The results are satisfactory and show, together with the foregoing results, that the shaping operation which is carried out above the fusion point is very reproducible.

APPLICATION OF THE TUBE ACCORDING TO THE INVENTION

For storing various products, foods, cosmetics, pharmaceutical products, hygiene products and maintenance products, particularly for products which are to be distributed more completely since the shoulder of the tube is able to be crushed, and for products which are to be protected from the effects of oxygen and water or humidity, whilst preserving their flavour or scent.

We claim:

1. A process for manufacturing a necked collapsible tube (3) having an end portion defined by a wall containing more than 60% by volume of a plastic material and comprising a substantially cylindrical tubular blank (4) formed of a multilayer laminate having at least one intermediate layer and inner and outer layers, at least the inside and outside surfaces of the inner and outer layers of the tubular blank being of polymeric plastic material, said tube (3) having at least a skirt (40) and a necked head (7), said process comprising a shaping operation where an end portion (5) of the tubular blank (4) which is free of folds is necked by bringing closer together an inner tool (1) and an outer tool (2), said shaping operation producing crumpled folds (13) of said end portion (5), and wherein:

a) prior to the shaping operation only the inside and outside surfaces of the polymeric plastic material of the inner and outer layers of the end portion (5) are brought to a viscous molten state by heating; and b) in said shaping operation necking said heated end portion (5) to form crumpled folds (13) in said end portion (5) by bringing closer together inner and outer tools (1 and 2) wherein said end portion is crushed to form crumpled folds absent a separate folding step, said crumpled folds (13) being formed only by movement of the inner and outer tools toward each other wherein said heated end portion (5) is crushed between said tools (1 and 2), and wherein the folds (13) are welded to each other, thereby producing said necked head (7) and thereby also forming a shoulder (8) between the necked head (7) and the skirt (40).

2. A process according to claim 1, in which the forming of the crumpled folds (13) together produces an exudate of plastic material forming a glazing of said shoulder with said plastic material.

3. A process according to claim 2, wherein said folds (13) are crushed to a degree necessary to reduce said shoulder (8) to a thickness less than 1.35 times the thickness of the skirt (40) of the tube (3).

4. A process according to claim 1, in which in step (a) the tubular blank (4) is initially placed between said inner tool (1) which has a top part (101) providing a forming surface for defining an inner surface of said necked head (7) and a rigid sleeve (36) which surrounds the end portion (5) with slight clearance and passing upwardly beyond it, said end portion (5) of the blank (4) and said top part (101) of the tool (1) being in a top position, and then hot gas is used to heat the inside of said end portion (5) until it deforms to become an undulating necked portion (37) which has a molten end edge (38), and then said sleeve (36) is removed from said undulating necked portion (37), and step (b) then follows.

5. A process according to claim 4, in which said end portion (5) is heated by introduction of hot gas of at least 250° C. through a nozzle having lateral orifices for ejecting hot gas radially through the lateral orifices which orifices are at least 3 mm below an end (50) of said end portion (5).

6. A process according to claim 5, including avoiding overheating of a top portion (101) of the inner tool by utilization of a deflecting and insulating element fixed under the hot gas introducing nozzle.

7. A process according to claim 4, in which the outer tool (2) is heated to between 100° and 150° C. and is provided with an inner non-stick lining on a surface juxtaposed to the inner tool.

8. A process according to claim 1, in which steps (a) and (b) are merged into a single step, and wherein the inside and outside surfaces of the end portion (5) are brought to a viscous state by the outer tool (2) which is heated to between 150° and 300° C. during crushing of the end portion and production of said crumpled folds (13).

9. A process according to claim 1, in which said temperature at the time of the shaping operation is greater by between 10° and 100° C. than the melting point of the polymeric plastic material which forms the inside and outside surfaces of the wall defining the tubular end portion.

10. A process according to claim 1, in which said plastic material forming the inside and outside surfaces of the wall are selected from the group consisting of polyethylene, polypropylenes, polyamides, modified polyamines, and saturated polyesters.

11. A process according to claim 10, in which said materials which form the inner and outer layers of the wall are each polyethylene and the temperature of which at the time of the shaping operation is between 150° and 220° C.

12. A process according to claim 1, in which the wall (4) defining said blank (4) is formed of a single class of polymeric plastics material.

13. A process according to claim 1, in which said at least one intermediate layer has a barrier effect.

14. A process according to claim 13, in which said wall of the blank (4) is between 0.2 and 0.9 mm in thickness, and in which the total thickness of said at least one intermediate layer which acts/act as a barrier (20) is between 0.01 and 0.05 mm and are selected from the group consisting of ethylene and vinyl alcohol copolymer, vinylidene polychloride, polyacrylonitrile, vinylidene polyfluoride, polyamide, 6 metaxylene diamine, vinyl chloride and vinylidene copolymer and alloyed aluminum.

15. A process according to claim 13, including providing a blank in which said at least one intermediate layer which has a barrier effect is selected from the group consisting of PE and polyesters, this layer being coated by a deposit comprising silica and/or alumina.

16. A process according to claim 1, in which said necked head (7) comprises a neck (9) which is less in diameter than the skirt (40), the neck being connected to the skirt (40) by said shoulder (8).

17. A process according to claim 16, in which said neck (9) of said necked head (7) is provided with an exteriorly threaded bottle-neck (3) of the tube, and in which said outer tool comprises a plurality of annular segments which are contracted after a step of raising of the blank (4) by the inner tool (1) and which segments have internal reliefs which mold threads on the outside of said neck for fixture of a threaded cap.

18. A process according to claim 16, including a step of fixing an annular rim (14) of plastic material to the outside of said neck (9) of tube (3).

19. A process according to claim 18, wherein said rim (14) is fixed by a step of compressing an annular blank (29) onto said shoulder (8) and around said neck (9), said annular blank (29) being of a plastic material which is compatible on melting with the plastic material of which the outer surface of the wall of the tubular blank (4) is when at a temperature of between 60° and 150° C. above its melting point during the step of compressing the annular blank.

20. A process according to claim 19, in which the thickness of said shoulder (8) is less than 1.35 times the thickness of the skirt (40), said skirt (40) being in thickness less than or equal to 0.6 mm, and in which the rim (14) has an annular base (16) extending to less than 1 mm from a joinder of the shoulder (8) to the skirt (40) and then becoming thinner from a thickness of less than 0.4 mm at the mid point of the shoulder (8) to a thickness of less than 0.15 mm at a periphery on or near said joinder of said shoulder (8) to the skirt (40).

21. A process according to claim 18, in which said annular rim (14) is bonded to the necked head by a process selected from the group consisting of adhesive bonding, ultrasonic welding, and induction welding.

22. A process according to claim 18, in which said rim (14, 140) is injection moulded onto said necked head, the moulded plastic material being compatible on melting with the material of which the outer surface of the wall of the tube (3) is made.

23. A process according to claim 22, wherein said rim (14) is injection moulded of plastic material onto the neck (9) and is provided with a central orifice (26) which is narrower than said neck (9) and portions of the molded rim are in the shape of straps (27) which are welded to the inside of the neck (9) and which straps are sized so as to extend to the inside surface of said shoulder (8), said moulded plastic material also being compatible on melting with the material of which the inside surface of the wall of said tube (23) is made, and the straps (27) also being bonded to the inside surface of the shoulder (8).

24. A process for manufacturing a necked collapsible tube (3) having an end portion defined by a wall containing more than 60% by volume of a plastic material and comprising a substantially cylindrical tubular blank (4), at least the inside and outside surfaces of the tubular blank being of polymeric plastic material, said tube (3) having at least a skirt (40) and a necked head (7), said process comprising a shaping operation where an end portion (5) of the tubular blank (4) is necked by bringing closer together an inner tool (1) and an outer tool (2), said shaping operation producing crumpled folds (13) of said end portion (5), and wherein:

a) prior to the shaping operation the polymeric plastic material is brought to a viscous state by heating, said blank (4) to bring said end portion (5) to a temperature at the time of the shaping operation which is at least equal to a melting point of said polymeric plastic material forming at least an inside surface and an outside surface of the wall of said blank (4); and b) in said shaping operation necking said heated end portion (5) to form crumpled folds (13) in said end portion (5) by bringing closer together inner and outer tools (1) and (2), said crumpled folds (13) being formed by movement of the inner and outer tools toward each other wherein said heated end portion (5) is crushed between said tools (1 and 2), wherein the folds (13) are welded to each other, thereby producing said necked head (7) and thereby also forming a shoulder (8) between the necked head (7) and the skirt (40), and wherein in step (a) the tubular blank (4) is initially placed between said inner tool (1) which has a top part (101) providing a forming surface for defining an inner surface of said necked head (7) and a rigid sleeve (36) which surrounds the end portion (5) with slight clearance and passing upwardly beyond it, said end portion (5) of the blank (4) and said top part (101) of the tool (1) being in a top position, and then hot gas is used to heat the inside of said end portion (5) until it deforms to become an undulating necked portion (37) which has a molten end edge (38), and then said sleeve (36) is removed from said undulating necked portion (37), and step (b) then follows.

25. A process according to claim 24, in which said end portion (5) is heated by introduction of hot gas of at least 250° C. through a nozzle having lateral orifices for ejecting hot gas radially through the lateral orifices positioned at least 3 mm below an end (50) of said end portion (5).

26. A process according to claim 25, including avoiding overheating of a top of the inner tool by utilization of a deflecting and insulating element fixed under the hot gas introducing nozzle.

27. A process according to claim 24, in which the outer tool (2) is heated to between 100° and 150° C. and is provided with an inner non-stick lining on a surface juxtaposed to the inner tool.

* * * * *